United States Patent [19]

McNally et al.

[11] Patent Number: 4,827,366
[45] Date of Patent: May 2, 1989

[54] BI-POLAR POWER SUPPLY REGULATOR
BI-POLAR POWER SUPPLY REGULATOR

[76] Inventors: Paul F. McNally, R.D. 7, Box 266, Gibsonia, Pa. 15044; Michael D. Salcone, 643 Oakview Dr., Verona, Pa. 15147

[21] Appl. No.: 241,754

[22] Filed: Sep. 7, 1988

Related U.S. Application Data

[63] Continuation of Ser. No. 938,520, Dec. 5, 1986, abandoned.

[51] Int. Cl.$^4$ .............................................. H02H 9/00
[52] U.S. Cl. ........................................ 361/18; 361/86; 361/88; 363/21; 363/78; 363/80; 323/299; 323/276
[58] Field of Search ........................ 361/18, 78, 84, 86, 361/88; 323/52, 90, 299, 276; 363/78, 79, 80, 21

[56] References Cited

U.S. PATENT DOCUMENTS 4,150,413  4/1979  Nerem .................................. 361/86
4,471,289  9/1984  Duley et al. ...................... 363/21 X Primary Examiner—Todd E. Deboer
Attorney, Agent, or Firm—Reed Smith Shaw & McClay

[57]    ABSTRACT

This invention relates to a bi-polar power supply regulator. A regulator is shown and described which prevents undesirable and potentially dangerous power supply build-up in a power amplifier of the standard totem pole configuration. The regulator also enables one to construct a multi-amplifier system in a cost effective manner since the regulator controls the build-up in the bi-polar power supply which is used to drive several power amplifiers in the totem pole configuration.

7 Claims, 3 Drawing Sheets

BI-POLAR POWER SUPPLY REGULATOR
BI-POLAR POWER SUPPLY REGULATOR

This is a continuation of co-pending application Ser. No. 06/938,520 filed on Dec. 5, 1986 now abandoned.

FIELD OF THE INVENTION

This invention relates to a bi-polar power supply regulator and, more particularly, to a regulator for a power amplifier which monitors the magnitude of both the positive and negative power supply connected to the power amplifier and causes current to circulate from one power supply to the other to prevent an undesirable build-up of charge in either power supply.

BACKGROUND OF THE INVENTION

One of the most common power amplifier configurations is the "H-bridge" as shown in FIG. 1. This configuration typically uses one power supply and four power switches (i.e. power transistors) to produce the desired current flow through a load. The load is the device to which power is delivered. It can be resistive, capacitive, or inductive. The advantage of the H-bridge configuration is that it uses only one power supply. The current to the load is controlled by means of the four power switches. During one half cycle, current flows from switch A through the load to switch D. During the other half cycle, current flows from switch B through the load to switch C.

There are, however, several disadvantages to using an H-bridge. The H-bridge requires four power switching devices for each load. Since power switching devices are usually the most expensive components of an amplifier, the cost of this configuration increases if several loads are driven by the same power supply. There is also a size limitation. The entire power amplifier must be large enough to accommodate four power switching devices. One other disadvantage is that during any half cycle power is always being dissipated in two power switching devices, either A and D or B and C.

An alternative power amplifier configuration is the "totem pole" or T-configuration as shown in FIG. 2. An advantage of this configuration is that it only requires two power switching devices and, therefore, can be made less expensive and more compact. Another advantage is that during any half cycle power is dissipated in only one power switch, thus minimizing power consumption.

The T-configuration, however, requires two power supplies, one positive and one negative. This is usually more costly than one power supply, but in a configuration where multiple loads are driven or where multiple amplifiers are operated from the same power supplies, the cost savings in power switching devices will offset the increased cost of two power supplies.

In many applications, the T-configuration is used to supply power to an inductive load. With an inductive load, however, there is a serious problem with using the T-configuration because the power supply voltages, if left unregulated, could reach destructive levels. There are devices which protect the power switching devices from excessive voltage levels, such as shown in U.S. Pat. Nos. 4,318,162 and 4,378,580; however, these do not protect the power supplies.

To illustrate the problem, consider the situation shown in FIG. 3 where an amplifier is supplying current to an inductive load. Initially, when power switch A turns on, current will flow into load L in the direction indicated by I. This current is being supplied by the positive power supply.

When the current in the load reaches a certain value, switch A is turned off. The turn-off value is typically detected by a current sensing means, usually a resistor, which is in series with load L. Since the load is inductive, the current therein cannot change instantaneously and must continue to flow in the same direction through the load until it decays. To enable this to happen, the current must flow through the diode around switch B as shown in FIG. 4 since it cannot flow through either switch A or switch B because both are turned off.

The current I that flows through the diode around switch B is fed back into the negative power supply. Typically, the negative power supply will be as shown in FIG. 5. The current I that is fed back into the negative power supply will flow into capacitor C in the direction shown in FIG. 5 and will charge the capacitor at a rate of I/C causing the voltage across capacitor C to increase. If nothing is done to correct this change in voltage, the actual magnitude of the voltage across capacitor C will, in time, reach potentially destructive levels, both to capacitor C and to power switches A and B.

During the switching action indicated by FIGS. 3 and 4, current drawn from the positive power supply is fed into the negative power supply since it was the positive power supply which initially generated the current I flowing in load L. Alternatively, if negative current was being fed into load L by power switch B and then switch B was turned off, current drawn from the negative power supply would be fed into the positive power supply resulting in a similar destructive change in voltage or build-up as has been described for the negative power supply.

Since power is supplied to the load, the average current in load L cannot be zero. As a result, the switching action between the power supplies does not cancel the power supply build-up. The voltage of each supply continues to increase with each cycle. There is a need, therefore, for a device which will correct this power supply build-up enabling one to construct a safe and reliable single or multiple power amplifier system in a cost effective manner using a minimum number of power switches.

SUMMARY OF THE INVENTION

The invention described in this application provides a power supply regulator which prevents potentially dangerous power supply build-up through recirculation of current from one power supply to another. The invention also permits construction of a multiple amplifier system in a cost effective manner. Many power amplifiers, such as shown in FIG. 2, may be connected to the same positive and negative power supplies. When this is done, each amplifier might have a different duty cycle which would have a different effect on the build-up in the power supplies. The power supply regulator of the present invention could be connected to the positive and negative power supplies and would control this build-up.

The power supply regulator of the present invention is particularly useful for bi-polar power supplies and comprises a power supply monitor, a switch control means for switching or regulating a plurality of power switches in response to a signal from the power supply monitor, and at least two power switches for circulating current between the two poles of a bi-polar power supply.

If the positive pole of a bi-polar power supply begins to increase in voltage, the power supply monitor of the regulator detects this build-up and causes current to be recirculated from the positive pole to the negative pole of the power supply. If the negative pole of a bi-polar power supply begins to decrease in voltage, the power supply monitor of the regulator detects this negative build-up and causes current to be circulated from the negative pole and returned to the positive pole of the power supply.

The regulator can be used in situations where the power supplies are independent. It also can be used to monitor several power amplifiers of the T-configuration which are driven by the same bi-polar power supply and have their own control circuitry.

DESCRIPTION OF PREFERRED EMBODIMENTS

Figure 4:
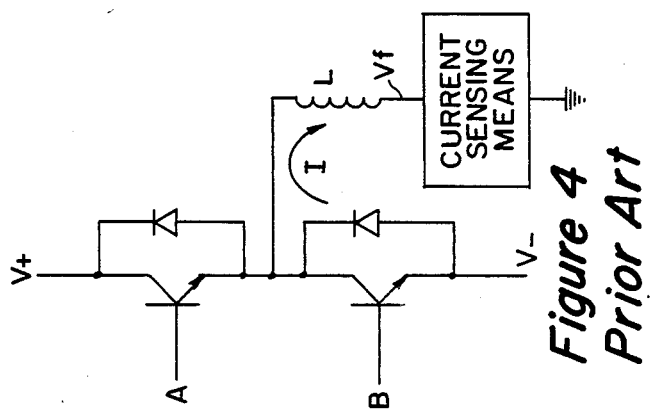
FIG. 4 is a prior art totem pole amplifier configuration showing the current in an inductive load immediately after switch A is turned off.
Figure 5:
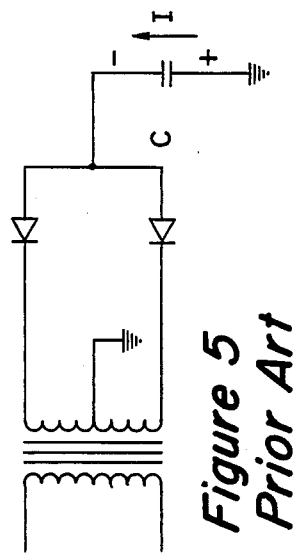
FIG. 5 is a typical prior art power supply.
Figure 3:
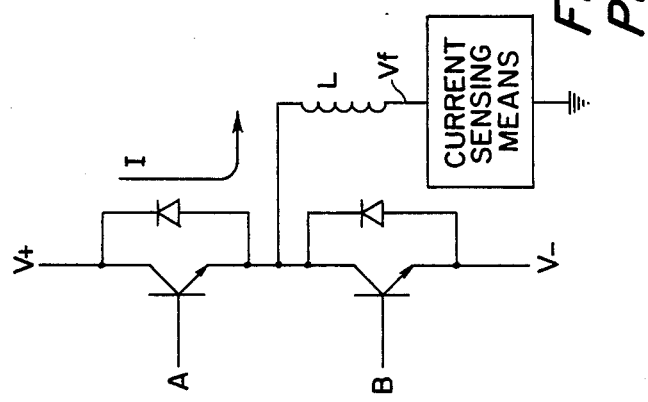
FIG. 3 is a prior art totem pole amplifier configuration with current being supplied to an inductive load through switch A.
Figure 1:
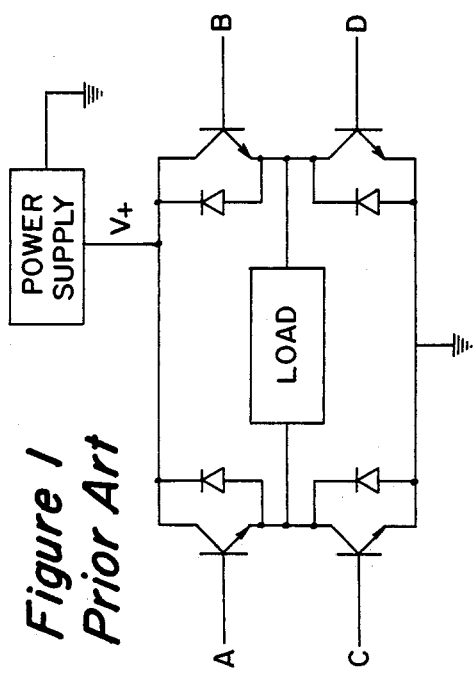
FIG. 1 is a prior art H-bridge amplifier configuration.
Figure 2:
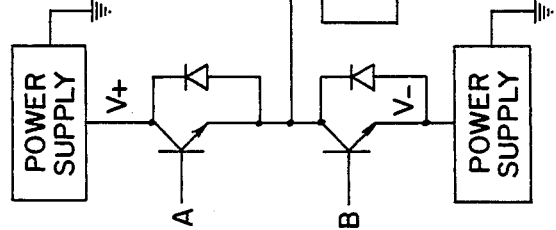
FIG. 2 is a prior art totem pole amplifier configuration.
Figure 6:
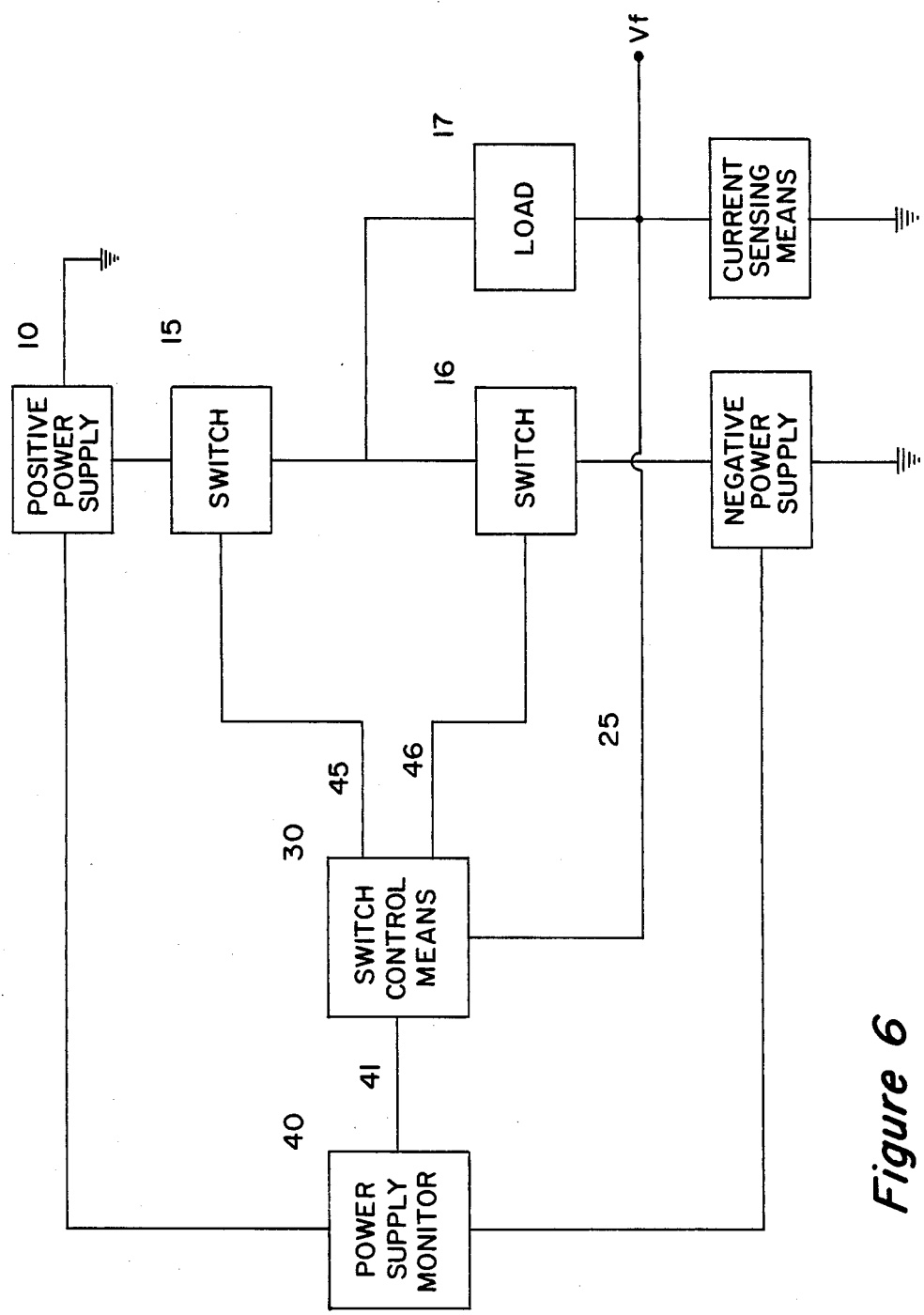
FIG. 6 is a power supply regulator described by the present invention.

A block diagram of a preferred embodiment of the invention described in this application is shown in FIG. 6. The two main parts of a bi-polar power supply are a positive power supply 10 and a negative power supply 11. Connected between the positive and negative poles of the power supply are power switch 15, power switch 16, and inductive load 17. These components are connected in the standard T-configuration as shown in FIG. 2. Other amplifiers may also be connected to power supplies 10 and 11. A current sensing means 20 is connected to load 17 to detect the current flowing through load 17 and to generate feedback signal 25(Vf) which is used by switch control means 30.

Power supply monitor 40 is connected to positive power supply 10 and negative power supply 11. It monitors the voltages of power supplies 10 and 11 to determine if the voltages are of equal magnitude. If monitor 40 detects a change in the voltage of either power supply, a signal 41 representing the magnitude of the change is sent to switch control means 30.

Switch control means 30 combines signal 41 from monitor 40 with current feedback signal 25 and the amplifier duty cycle signal to generate control signals 45 and 46. Control signal 46 is the inverse of control signal 45. Depending upon which power supply voltage is changing as indicated by input signal 41 and what current is flowing in load 17 as indicated by feedback signal 25, switch control means 30 will either turn on switch 15 and turn off switch 16 or will turn on switch 16 and turn off switch 15. This will cause current to flow to load 17 from the power supply whose voltage is changing. Energy will be stored in load 17 (usually inductive) reducing the magnitude of the voltage of the power supply which was changing and preventing the voltage build-up from reaching dangerous levels. The stored energy will be transferred to either power supply 10 or 11 depending on their voltage levels.

Figure 7:
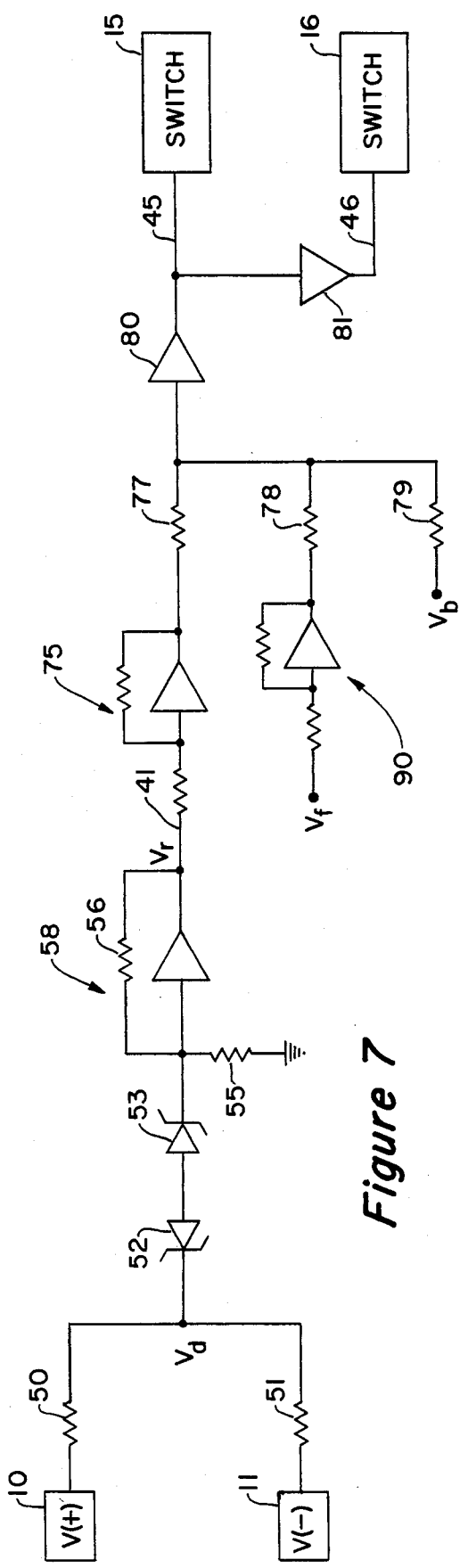
FIG. 7 is a preferred embodiment of the power supply monitor and switch control means of the regulator described by the present invention.

FIG. 7 shows a preferred embodiment of power supply monitor 40 and switch control means 30. Power supplies 10 and 11 are connected together through resistors 50 and 51. These resistors act as voltage dividers and determine the difference between the power supply voltages. Typically, resistors 50 and 51 have the same value.

In the ideal condition, $V(+) = |V(-)|$. If resistor 50 and resistor 51 have the same value, then $Vd = 0$ and there is no need to recirculate current between the power supplies. But, if $V(+)$ starts to rise, becoming greater than $|V(-)|$, Vd will no longer be zero.

Zener diodes 52 and 53 act as threshold setters. Amplifier 58 will not be activated until Vd is greater than the breakdown voltage Vz of either diode 52 or 53. Thus, Vd must be greater than some threshold value Vz before a recirculation control signal is sent to the switch control means 30. By choosing different zener diodes having different breakdown voltages Vz, any threshold voltage may be selected.

Figure 8:
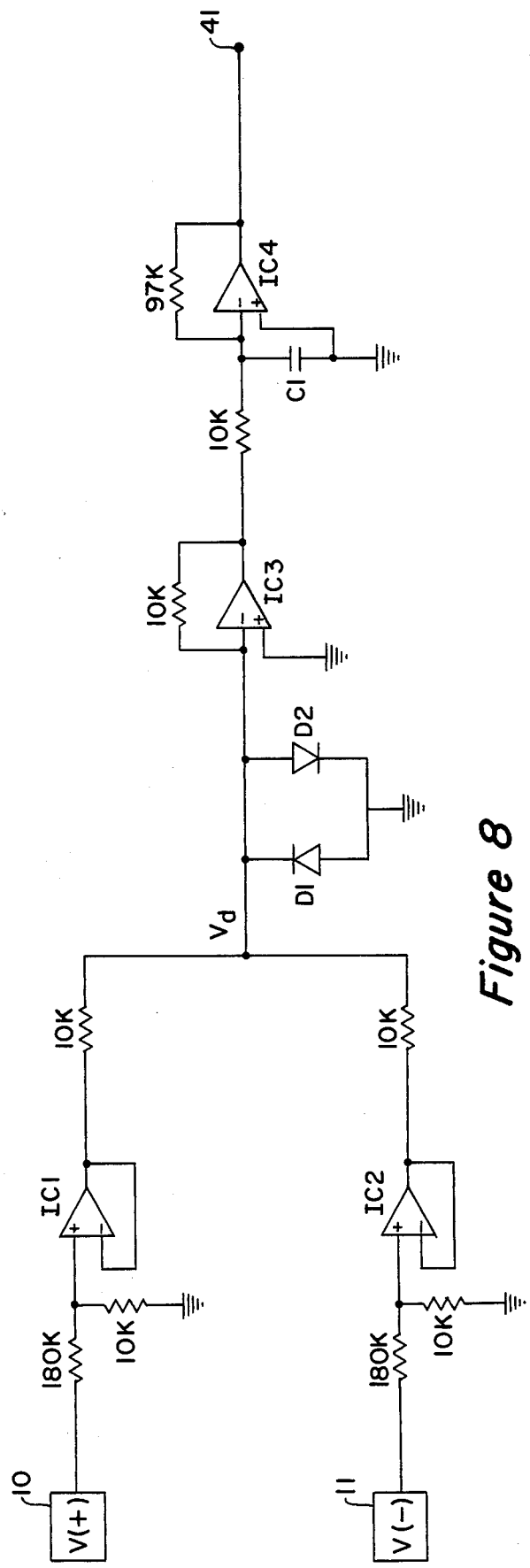
FIG. 8 is a preferred embodiment of the power supply monitor.

Alternatively, diodes 52 and 53 may be removed, in which case the amplifier tracks the voltage Vd continuously instead of tracking Vd only above some threshold voltage Vz. For example, FIG. 8 shows a power supply monitor having no threshold setting zener diodes.

Amplifier 58 amplifies the difference in the power supply voltages Vd. The values of resistors 55 and 56 determine the gain of amplifier 58. The gain of amplifier 58, in turn, determines the degree of regulation of the power supplies. The higher the gain in amplifier 58, the higher the degree of regulation because a smaller value of Vd produces a larger value of Vr. The value of Vr determines how much current recirculation is necessary to return the power supply voltage levels to their normal condition.

Vr represents signal 41 which is fed from power supply monitor 40 to switch control means 30. Switch control means 30 is usually just a switch 80 although it may include other elements such as amplifier 75. Normally, switch 80 is turned on or off in response to a standard input Vb, such as a saw-tooth wave. The duty cycle of the amplifier system is determined by this saw-tooth wave. The duty cycle determines how often switches 15 and 16 are turned on and off. Vb may be biased in either the positive or negative direction so that the net current to load 17 is either positive or negative.

Typically, a feedback signal 25(Vf), from load 17 is amplified by amplifier 90 and combined with Vb. Together, these signals through resistors 78 and 79 activate switch 80 which in turn activates switches 15 and 16. The signal from switch 80 is fed directly to switch 15 but is inverted by inverter 81 before being fed to switch 16. Without recirculation control, switch 80 turns on and off only in response to Vb as modified by Vf. Since the duty cycle Vb is unrelated to the power supply voltages, switch 80 cannot correct for a build-up in the power supply voltage.

Signal 41(Vr), however, enables switch 80 to respond to a power supply build-up indicated by the difference in the power supply voltages. Signal 41 is amplified by amplifier 75 and connected through resistor 77 to switch 80. Signal 41, depending upon the amount of current which needs to be recirculated, enables switch 80 to turn off sooner or to stay on longer than it would if just Vf and Vb were activating it. By varying the on/off time of switch 80, the on/off time of switches 15 and 16 are varied and the appropriate current recirculation can occur, regulating power supplies 10 and 11.

FIG. 8 shows a specific embodiment of a power supply monitor according to the present invention. IC1 and IC2 (TL084) act as buffers for the input power supply voltage which is reduced by the 180K/10K voltage divider. The reduced power supply voltages are combined by IC3 (TL081) after passing through the 10K resistors. The voltage difference is then amplified by IC4 (TL084) to obtain a higher degree of regulation before being sent to the switch control means. Diodes D1 and D2 are used to limit the magnitude of VD so that it does not exceed the maximum which IC3 can handle.

While presently preferred embodiments of the invention have been described and shown with particularity in connection with the drawings, the invention may be otherwise embodied within the scope of the appended claims.

What is claimed is:

1. A power supply regulator used in regulating a positive and a negative power supply to prevent power supply build-up comprising:
    a power supply monitor which detects any voltage difference between the magnitude of the positive power supply and the magnitude of the negative power supply and generates a signal only if the difference in the magnitudes is greater than a threshold value;
    at least two power switches for normally supplying power to a load from said power supplies;
    a switch control means which modifies the duty cycle of said switches during said signal so that the average load current is either more positive or more negative than during normal operation;
    said switches being controllable to circulate current between the positive power supply and the negative power supply to reduce power supply build-up.

2. The device as described in claim 1 further comprising:
    a current sensing means for sensing current flowing in a load; and wherein the switch control means receives and responds to a signal from the current sensing means.

3. The device as described in claim 2 wherein the positive and negative power supplies are connected to a plurality of power amplifiers.

4. The device as described in claim 1 wherein the positive and negative power supplies are part of a bipolar power supply.

5. In a power amplifier of the T-configuration having a positive and negative power supply, at least two power switches for normally supplying power to a load and a power supply regulator for preventing power supply build-up, the improvement in said power supply regulator comprising:
    a power supply monitor which detects any voltage difference between the magnitude of the positive power supply and the magnitude of the negative power supply and generates a signal only if the difference in the magnitudes is greater than a threshold value;
    a switch control means which modifies the duty cycle of said switches during said signal so that the average load current is either more positive or more negative than during normal operation;
    said switches being controllable to circulate current between the positive power supply and the negative power supply thereby reducing power supply buildup.

6. The device as described in claim 5 further comprising a current sensing means for sensing flowing current in a load; and wherein the switch control means receives and responds to a signal from the current sensing means.

7. The device as described in claim 6 wherein the positive and negative power supplies are connected to a plurality of power amplifiers.

* * * * *